(12) United States Patent
Wei et al.

(10) Patent No.: US 8,220,695 B1
(45) Date of Patent: Jul. 17, 2012

(54) METHOD FOR BONDING ALUMINUM OXIDE TO STAINLESS STEEL

(75) Inventors: Ming-Hsiung Wei, Taoyuan County (TW); Dong-Hau Kuo, Taipei (TW); Ren-Kae Shiue, Taipei (TW); Kai-Ting Yeh, Taipei (TW)

(73) Assignee: Chung-Shan Institute of Science and Technology, Armaments Bureau, Ministry of National Defense, Taoyuan County (TW)

( * ) Notice: Subject to any disclaimer, the term of this patent is extended or adjusted under 35 U.S.C. 154(b) by 0 days.

(21) Appl. No.: 13/328,127

(22) Filed: Dec. 16, 2011

(30) Foreign Application Priority Data

Jun. 10, 2011 (TW) .............................. 100120281 A

(51) Int. Cl.
*B23K 31/02* (2006.01)
(52) U.S. Cl. ................. 228/122.1; 228/221; 228/262.42
(58) Field of Classification Search .................. None
See application file for complete search history.

(56) References Cited

U.S. PATENT DOCUMENTS

| | | | | |
|---|---|---|---|---|
| 2,475,517 A | * | 7/1949 | Ries et al. | 451/546 |
| 2,562,587 A | * | 7/1951 | Swearingen | 433/166 |
| 2,848,391 A | * | 8/1958 | Fahnoe et al. | 205/187 |
| 3,034,205 A | * | 5/1962 | Ames | 428/633 |
| 3,153,581 A | * | 10/1964 | Hutchins, IV | 428/594 |
| 3,213,184 A | * | 10/1965 | Bondley | 174/50.58 |
| 3,284,118 A | * | 11/1966 | Kessler, Jr. | 403/29 |
| 3,402,458 A | * | 9/1968 | Asaff | 228/124.1 |
| 3,403,043 A | * | 9/1968 | Thompson | 428/560 |
| 3,573,021 A | * | 3/1971 | Smith | 65/43 |
| 3,608,183 A | * | 9/1971 | Lemelson | 29/527.7 |
| 4,003,715 A | * | 1/1977 | Cascone | 428/555 |
| 4,552,301 A | * | 11/1985 | Liehr et al. | 228/234.1 |
| 4,602,731 A | * | 7/1986 | Dockus | 228/121 |
| 4,699,310 A | * | 10/1987 | Kohno et al. | 228/122.1 |
| 5,043,229 A | * | 8/1991 | Mizuhara | 428/613 |
| 5,069,978 A | * | 12/1991 | Mizuhara | 428/594 |
| 5,161,728 A | * | 11/1992 | Li | 228/124.1 |

(Continued)

FOREIGN PATENT DOCUMENTS

JP EP-0595433 A * 5/1994

OTHER PUBLICATIONS

Kar, Abhijit et al., Effect of interfacial thickness and residual stress on the mechanical property of the alumina-stainless steel braze joint interface, Materials Science and Engineering A, Elsevier B.V. 2008, vol. 498, pp. 283-288.

(Continued)

*Primary Examiner* — Kiley Stoner
(74) *Attorney, Agent, or Firm* — Jackson IPG PLLC; Demian K. Jackson

(57) ABSTRACT

Disclosed is a method for bonding stainless steel to aluminum oxide. The method includes the steps of providing a first substrate of the stainless steel, filling solder in the first substrate, providing a second substrate of the aluminum oxide, filling solder in the second substrate, providing a net, pressing the net, locating the net between the first and second substrates to form a laminate and clamping the laminate, locating the laminate in a vacuum oven, increasing the temperature in the vacuum oven, retaining the temperature in the vacuum oven, and decreasing the temperature in the vacuum oven.

8 Claims, 17 Drawing Sheets

U.S. PATENT DOCUMENTS

| | | | |
|---|---|---|---|
| 5,277,942 A * | 1/1994 | Ikegaya et al. | 428/332 |
| 5,338,577 A * | 8/1994 | Burdette, II | 427/453 |
| 5,425,494 A * | 6/1995 | Rosenthal et al. | 228/124.5 |
| 5,598,966 A * | 2/1997 | Romano et al. | 228/124.6 |
| 5,817,406 A * | 10/1998 | Cheung et al. | 428/210 |
| 5,860,584 A * | 1/1999 | Inazuru | 228/121 |
| 6,280,584 B1 * | 8/2001 | Kumar et al. | 204/298.15 |
| 2003/0208896 A1 * | 11/2003 | Gakovic | 29/428 |
| 2006/0193937 A1 * | 8/2006 | Gakovic | 425/352 |
| 2009/0084983 A1 * | 4/2009 | Simandl et al. | 250/492.1 |
| 2011/0236713 A1 * | 9/2011 | Radwan et al. | 428/610 |

OTHER PUBLICATIONS

Nascimento, R.M. et al., Brazing Al2O3 to sintered Fe-Ni-Co alloys, Journal of Materials Science, Kluwer Academic Publishers, 1999, vol. 34, pp. 5839-5845.

Paiva, O.C. et al., Microsctructure, mechanical properties and chemical degradation of brazed AISI 316 stainless steel/alumina systems, Materials Science and Engineering A, Elsevier B.V. 2008, vol. 480, pp. 306-315.

Rohde, M. et al., Joining of alumina and steel by a laser supported brazing process, Ceramics International, Jan. 29, 2008, vol. 35, pp. 333-337, Elsevier B.V.

Shirzadi, A.A., et al., Joining ceramics to metals using metallic foam, Materials Science and Engineering A, Elsevier B.V. 2008, vol. 496, pp. 501-506.

Zhang, L.X. et al., Interface microsctucture and mechanical properties of the brazed SiO2 glass ceramic and 30Cr3 high-tensile steel joint, Materials Science and Engineering A, Elsevier B.V. 2008, vol. 496, pp. 393-398.

* cited by examiner

| Spot | Al | Fe | O | Ni | Ti | Cu | Ag | Total |
|---|---|---|---|---|---|---|---|---|
| 1 | 0.7 | 3.6 | 3.0 | 33.3 | 0.0 | 58.7 | 0.6 | 100 |
| 2 | 0.2 | 0.1 | 1.6 | 95.6 | 0.0 | 2.2 | 0.1 | 100 |
| 3 | 0.4 | 0.2 | 2.0 | 48.3 | 0.0 | 48.6 | 0.6 | 100 |
| 4 | 1.7 | 0.0 | 9.6 | 1.0 | 0.0 | 7.4 | 80.1 | 100 |
| 5 | 1.4 | 0.0 | 4.2 | 10.5 | 0.7 | 82.2 | 1.1 | 100 |
| 6 | 0.3 | 0.1 | 2.1 | 66.3 | 22.2 | 8.1 | 1.0 | 100 |

FIG. 9

| Spot | Al | Fe | O | Ni | Ti | Cu | Ag | Total |
|---|---|---|---|---|---|---|---|---|
| 1 | 0.2 | 4.3 | 1.9 | 61.5 | 16.8 | 15.2 | 0.1 | 100 |
| 2 | 1.0 | 0.7 | 2.6 | 29.8 | 1.4 | 64.3 | 0.4 | 100 |
| 3 | 3.1 | 0.1 | 5.4 | 7.1 | 0.2 | 82.3 | 1.7 | 100 |
| 4 | 0.1 | 0.5 | 1.8 | 69.4 | 22.9 | 3.6 | 1.8 | 100 |
| 5 | 2.0 | 0.0 | 4.7 | 7.2 | 0.2 | 84.0 | 2.0 | 100 |
| 6 | 0.1 | 0.0 | 1.5 | 70.2 | 24.7 | 3.3 | 0.2 | 100 |
| 7 | 3.4 | 0.0 | 7.0 | 5.2 | 0.2 | 81.8 | 2.4 | 100 |
| 8 | 1.1 | 0.1 | 14.0 | 47.8 | 25.9 | 4.6 | 6.5 | 100 |

FIG. 13

METHOD FOR BONDING ALUMINUM OXIDE TO STAINLESS STEEL

BACKGROUND OF INVENTION

1. Field of Invention

The present invention relates to a method for bonding metal to ceramics and, more particularly, to a method for bonding stainless steel to aluminum oxide.

2. Related Prior Art

In general, metal exhibits reliable mechanical strength, water-tightness, thermal conductivity and electric conductivity. Metal may be bonded to metal, ceramics or glass to improve thermal performance, electric performance, mechanical strength and/or air-tightness, and/or reduce thermal expansion.

Ceramics is refractory, chemically stable, anti-oxidation, electrically isolative, dense and optical. Ceramics may be made from different components in different processes and used in the electronic industry, the aerospace industry, the nuclear industry, the automobile industry, fuel cells, cutting tools, or the biotechnology.

In many cases, metal is bonded to ceramics. In these cases, wearing, erosion, scratching, oxidation, thermal resistance, air-tightness, mechatronics and reliability are be taken into consideration. Bonding of metal to ceramics is often used in the defense industry, automobile electronic parts, sealing of photoelectric elements or semiconductor, the aerospace industry, fuel cells, cutting tools, the chemical industry, the environmental protection, optical fibers for telecommunication, and the biotechnology.

There are however problems related to residual thermal stress and wetability. For example, the thermal expansion coefficient of AISI 316 stainless steel is $18 \times 10^{-6} K^{-1}$ while the thermal expansion coefficient of aluminum oxide ("$Al_2O_3$") is $6 \times 10^{-6} K^{-1}$. There is a big difference between the thermal expansion coefficient of aluminum oxide and that of AISI 316 stainless steel. Brazing for bonding aluminum to AISI 316 stainless steel is a big challenge in the material science and engineering.

Ag—Cu—Ti alloy is often used as active brazing solder for bonding aluminum oxide to AISI 316 stainless steel in the semiconductor industry that requires ultra vacuum tightness. Such bonding can only be executed in small areas or in a slowly heating or cooling process, and the $Al_2O_3$ must be subjected to sintering and hot isostatic pressing for excellent mechanical strength. The $Al_2O_3$ requires mechanical strength against thermal stress so that the thermal stress, although it may be high, does not exceed the mechanical strength of the $Al_2O_3$ to ensure the success of the bonding. If the quality of the $Al_2O_3$ is poor, i.e., the mechanical strength of the $Al_2O_3$ varies from region to region, cracks will almost certainly occur in weak points of the $Al_2O_3$ and finally cause the bonding to fail. Obviously, to successfully bond together elements of different values of mechanical strength against thermal stress, the mechanical strength of the elements must be high or there must be an analyzed, solid-solution or diffused solder seam.

Recently, ceramics develops fast and is used in various fields, and many processes have been used to bond metal to ceramics such as diffusion bonding, brazing and welding. Among these processes, brazing is deemed the best process to bond metal to ceramics. Base materials are not molten in brazing so that brazing can be used to bond together materials that cannot be bonded together by welding.

To bond metal to ceramics by brazing, there is however a problem that most sorts of brazing solder cannot wet the ceramics effectively and the interface between the brazing solder and the ceramics is not strong enough. To improve the wetabilty, there are several approaches. Mo—Mn metallization process has been applied with long history for ceramic-metal joining in industry. The Mo—Mn process involves the metallization of ceramic materials by the mixture of Mo and Mn or $MnO_2$ at higher temperature of 1450° C. under controlled humidity, followed by brazing the metalized ceramic with steel. The ceramics may be metalized before the brazing. Alternatively, the brazing solder may be dosed with an active element such as titanium, zirconium and chromium that reacts with the ceramics in the brazing so that the brazing solder wets the ceramics. This process is called the "active brazing."

There have been many researches for the active brazing for two reasons. At first, most sorts of ceramics are chemically stable, and traditional sorts of brazing solder fail to wet the ceramics adequately even though the surface of the ceramics is very clean. Secondly, the active element added in the brazing solder improves the wetability considerably.

The most popular active brazing solder is silver-copper eutectic crystal dosed with 2 wt % to 5 wt % of titanium. The silver-based active brazing solder wets most sorts of ceramics and forms good bonding. Because of the active element added to the brazing solder, reaction occurs between the ceramics and the brazing solder. The morphology, composition and thickness of the reactant influence the mechanical strength of the bonding. Hence, various mechanisms of fissures in bonding have been discussed in many papers based on theories and experiments. It has been found in the experiments that most fissures occur at the interface or in the ceramics.

In addition to the Mo—Mn process, the metal-ceramic joining has been executed by the active brazing method with the Ag-base active braze solder. For example, as disclosed by L. X. Zhang et al. in 2008, glass has been bonded to 30Cr3 stainless steel successfully by Ag-21 Cu-4.5Ti at 840° C. to 1000° C. for 5 minutes. The titanium reacts with the silicon, the oxygen and the iron to form $Ti_4O_7$, $TiSi_2$ and $TiFe_2$ to improve the bonding while the residual silver and copper are turned into solid solution or analyzed in the region of brazing. As the temperature rises, the thickness of the reaction layer increases.

For example, as disclosed by O. C. Paiva et al. in 2008, AISI 316 stainless steel has been bonded to 99.6% aluminum oxide by Ag-26.5Cu-3Ti ("CB4") and Ag-34.5Cu-1.5Ti ("CB5") successfully. The temperature may be 850° C., 900° C. or 950° C. The brazing lasts for 20 minutes. The rates for the temperature to rise and fall are 5° C. and 1.2° C., respectively. The best mechanical strength against shear is 234±18 MPa where CB4 is used and the brazing is executed at 850° C. For CB5, the best mechanical strength against shear is 224 MPa where the brazing is executed at 900° C. As the temperature rises, the thickness of the reaction layer and the concentration of the Ti at the interface fall. The reduction of the thickness of the reaction layer probably may be attributed to inadequate mechanical strength. Moreover, the heating and cooling rates still have to be low.

In researches for brazing, it has been found that in an early stage, at the interface, Ti reacts with aluminum oxide to form $Ti_3(CuAl)_3O$, not $TiO_2$, and this reaction layer dissolves a large amount of Al. It is however not possible to precisely obtain the relation of the forming of this reaction layer to the dynamic wetting angle from the experiments. Influences on the mechanical strength of the bonding by the form of the interface require further exploring.

In a few papers, copper-based or silver-based brazing solder is dosed with an active element such as Zr and Hf to provide active brazing solder such as Cu-22% Ti alloy, Cu-10% Zr alloy, Cu-15% Hf alloy and Ag—Cu—Zr alloy. These sorts of active brazing solder may be used for brazing AlN, Mullite or $ZrO_2$. There have however been very few analyses of the dynamic wetting and reaction at the interface between the active brazing solder and the ceramics, and further exploring is needed.

Moreover, Shirzada et al. has used stainless steel foam in brazing for bonding aluminum oxide to AISI 316 stainless steel. The mechanical strength against shear is only 33 MPa. As reported by Zhang et al. and Rohde et al., results of four-point bending tests on aluminum oxide bonded to stainless steel are 210 MPa and 80 MPa. As disclosed by Paiva and Barbosa, the maximum mechanical strength against shear is 234±18 MPa; however, there is a crack at the 316 SS/solder interface. In all of the papers on brazing for bonding stainless steel to aluminum oxide, in the brazing, the temperature is controlled to fall at a very low rate (<5° C./min). Kar et al. attributes the low mechanical strength of 64 to 94 MPa to the difficulty in controlling the reaction layer in the brazing. In a study by Do Nascimento et al. of Kovar/$Al_2O_3$ brazing where the difference between the thermal expansion coefficients is small, the mechanical strength in three-point bending tests is only 130 MPa.

As discussed above, two problems have been encountered in brazing for bonding metal to ceramics. At first, the ceramics is fragile and vulnerable to unexpected fissures. Secondly, As ceramics is fragile and metal is malleable, the joint of ceramic and metal exhibits poor mechanical strength against thermal stress. Hence, the ceramics and the metal must be carefully chosen so that the difference between the thermal expansion coefficients thereof is small to reduce thermal stress. Hence, it is desirable to bond Kovar or alloy with a low thermal expansion coefficient to Pyrex or ceramics. However, Kovar or the alloy with a low thermal expansion coefficient is vulnerable to erosion, poor mechanical strength at high temperature, and a high cost for including a lot of nickel. Theoretically speaking, it is very difficult to bond aluminum oxide to alloy of a high thermal expansion coefficient such as AISI 316 stainless steel.

To improve brazing for bonding metal to ceramics, attention is paid to mechanical bonding, chemical bonding or wetting the ceramics with brazing solder. Regarding the mechanical bonding, bosses are formed on the metal (or the ceramics) and recesses are defined in the ceramics (or the metal) so that the bosses can be fit in the recesses to enhance the bonding of the metal to the ceramics.

Regarding the chemical bonding, the metal is oxidized to form a layer of oxidation previously. The layer of oxidation reacts with the ceramics at high temperature to form chemical bonds.

About the use of the brazing solder, it is important to wet the ceramics. The wetability is determined by a contact angle. The wetability is good where the contact angle is acute (<90°). The wetability is poor where the contact angle is obtuse (>90°). However, most sorts of brazing solder do not wet ceramics effectively. As a result, the mechanical strength at the interface between the brazing solder and the ceramics is inadequate, and so is the bonding. Moreover, as the temperature rises, the thickness of the reaction layer and the concentration of Ti at the interface fall. Furthermore, in the brazing by providing the brazing solder between the ceramics and the metal, the temperature must be controlled to rise very slowly, and the dynamic wetting interface reaction is incomplete, and the control over the reaction layer is difficult.

Bonding of aluminum oxide to AISI 316 stainless steel has often been used in the industry. However, high temperature is required during the bonding, and this is a burden on the financial side. (ie:Mo—Mn metallization process has been applied.) To lower the temperature without jeopardizing the mechanical strength of the bonding, efforts are made in two aspects. At first, the wetability of the ceramics by the brazing solder should be improved. Poor wetability results in poor bonding. Secondly, the residual stress should be reduced. High residual stress results in high possibility of cracks or even breach in the ceramics after the bonding.

The present invention is therefore intended to obviate or at least alleviate the problems encountered in prior art.

SUMMARY OF INVENTION

It is an objective of the present invention to provide an effective method for bonding stainless steel to aluminum oxide.

To achieve the foregoing objective, the method includes the steps of providing a first substrate of the stainless steel, filling solder in the first substrate, providing a second substrate of the aluminum oxide, filling solder in the second substrate, providing a net, pressing the net, locating the net between the first and second substrates to form a laminate and clamping the laminate, locating the laminate in a vacuum oven, increasing the temperature in the vacuum oven, retaining the temperature in the vacuum oven, and reducing the temperature in the vacuum oven.

In an aspect, the solder filled in the first substrate is silver-copper brazing solder.

In another aspect, the solder filled in the second substrate is silver-copper-titanium brazing solder.

In another aspect, the net is made of nickel.

In another aspect, the pressing of the net is done by a hydraulic device operated at 300 to 500 psi for 5 to 15 minutes.

In another aspect, the vacuum oven is operated at $10^{-4}$ to $10^{-6}$ Torr.

In another aspect, the step of retaining the temperature in the vacuum oven includes the step of retaining the temperature in the vacuum oven at 800° C. to 1000° C.

In another aspect, the step of reducing the temperature in the vacuum oven includes the step of reducing the temperature in the vacuum oven at a rate of 5 to 15° C./min.

In another aspect, the silver-copper-titanium brazing solder includes 68.8 wt % of silver, 26.7 wt % of copper and 4.5 wt % of titanium. The titanium is used for reacting with oxide to improve the wetability between the ceramics and the metal.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein:

FIG. 9 is a table to show composition of the points of the bonding shown in FIGS. 6 to 8;

FIG. 13 is a table to show composition of the points of the bonding shown in FIGS. 10 to 12;

DETAILED DESCRIPTION OF EMBODIMENTS

Figure 1:
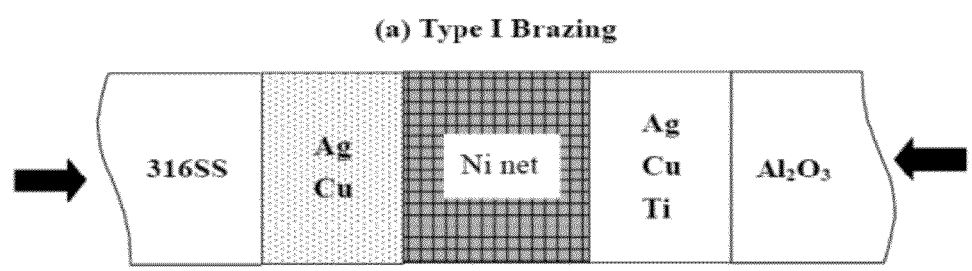
FIG. 1 is a cross-sectional view of stainless steel bonded to ceramics by a method according to the first embodiment of the present invention.

Referring to FIG. 1, there is shown aluminum oxide bonded to AISI 316 stainless steel by a method according to a first embodiment of the present invention. A nickel net, traditional brazing solder and active brazing solder are used to bond the aluminum oxide to the AISI 316 stainless steel ("SS"). The traditional brazing solder is Ag—Cu (72Ag-28Cu, wt %). The active brazing solder is Ag—Cu—Ti (63.8Ag-26.7Cu-4.5Ti, wt %). Titanium (Ti) exhibits the excellent oxygen-reacting ability to improve the wetability of the ceramics by the braze. The bonding sequence is AISI 316 SS/Ag—Cu×2/Ni/Ag—Cu-4.5Ti×2/$Al_2O_3$.

Figure 2:
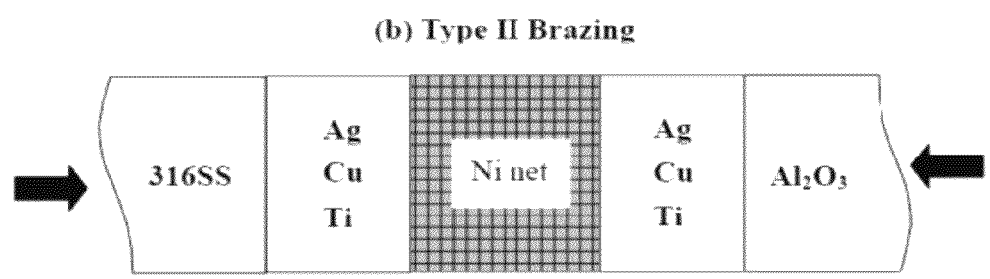
FIG. 2 is a cross-sectional view of stainless steel bonded to ceramics by a method according to the second embodiment of the present invention.

Referring to FIG. 2, there is shown aluminum oxide bonded to AISI 316 SS by a method according to a second embodiment of the present invention. A nickel net and active brazing solder are used to bond the aluminum oxide to the AISI 316 SS. The active brazing solder is Ag—Cu—Ti (63.8Ag-26.7Cu-4.5Ti, wt %). The bonding is AISI 316 SS/Ag—Cu-4.5Ti×2/Ni/Ag—Cu-4.5Ti×2/$Al_2O_3$.

The nickel net is used for three purposes. At first, it limits the amount of the Ti of the Ag—Cu-4.5Ti diffusing to the $Al_2O_3$ to prevent a reaction layer of poor mechanical strength. Secondly, it provides Ni to form Ni—Cu alloy with the Cu of the Ag—Cu alloy. Thirdly, it provides Ni to form intermetallic compounds with the Ti and Cu of the Ag—Cu-4.5Ti alloy.

In traditional bonding of metal to ceramics, to prevent thermal stress from causing any fracture, the metal is limited to those sorts with low thermal expansion coefficients such as Kovar and Fe—Ni—Co alloy to match the $Al_2O_3$, which exhibits a low thermal expansion coefficient. Alternatively, the ceramics is limited to those sorts that exhibit high mechanical strength such as silicon carbide or silicon nitride or a sort that exhibits high mechanical strength and a high thermal expansion coefficient such as zirconium oxide stabilized by yttrium oxide. Alternatively, soft metal such as copper and nickel is used to release thermal stress.

To bond metal to ceramics, the most popular sort of brazing is active metal brazing where the wetability of the ceramics is improved so that the ceramics can be bonded to the metal by brazing. The most popular active brazing solder is Ag—Cu—Ti alloy. Preferably, 68.8Ag-26.7Cu-4.5Ti brazing solder is used.

Tests are executed under the following conditions:

At first, the nickel net is pressed by a hydraulic device. The hydraulic pressure is set to be 400 psi. The pressing lasts for 10 minutes.

Secondly, the pressed nickel net, the AISI 316 stainless steel, the aluminum oxide, the Ag—Cu—Ti alloy and the Ag—Cu alloy together form the AISI 316 SS/Ag—Cu×2/Ni/Ag—Cu-4.5×2/$Al_2O_3$ as shown in FIG. 1, and then clamped and dried in a vacuum oven in which the temperature rises to 900° C., and maintains at 900° C. for 10 minutes, and then falls. The solder seam (or "bead") is about 210 m wide. The pressed nickel net is about 200 m thick. Hence, it is found that almost all of the Ag—Cu—Ti alloy and the Ag—Cu alloy are filled in the nickel net. It is also found that a wide solder seam is achieved. Wide solder seams are needed in large-scale high-temperature construction such as high-temperature reaction tanks, steel mills, engine starters and nuclear reactors. The nickel net attracts the Ti of the Ag—Cu—Ti alloy and suppresses the diffusion of the Ti to the $Al_2O_3$ to prevent over-reaction from forming a reaction layer of poor mechanical strength. Hence, the nickel net limits the diffusion of the brazing active element to control the reaction layer on the $Al_2O_3$ without jeopardizing the wetting and bonding.

Vacuum brazing belongs to oven brazing. In vacuum brazing, the pressure is about $10^{-4}$ to $10^{-6}$ Torr. Vacuum is an effective environment for protection. The concentration of impurities in vacuum is much lower than the concentration of impurities in any sort of noble gas. Hence, vacuum provides better protection than any sort of noble gas. Nickel-based superalloy includes Al and Ti that are vulnerable to oxidation. The vacuum is used to avoid oxidation. Thus, the quality of the brazing is good.

Figure 3:
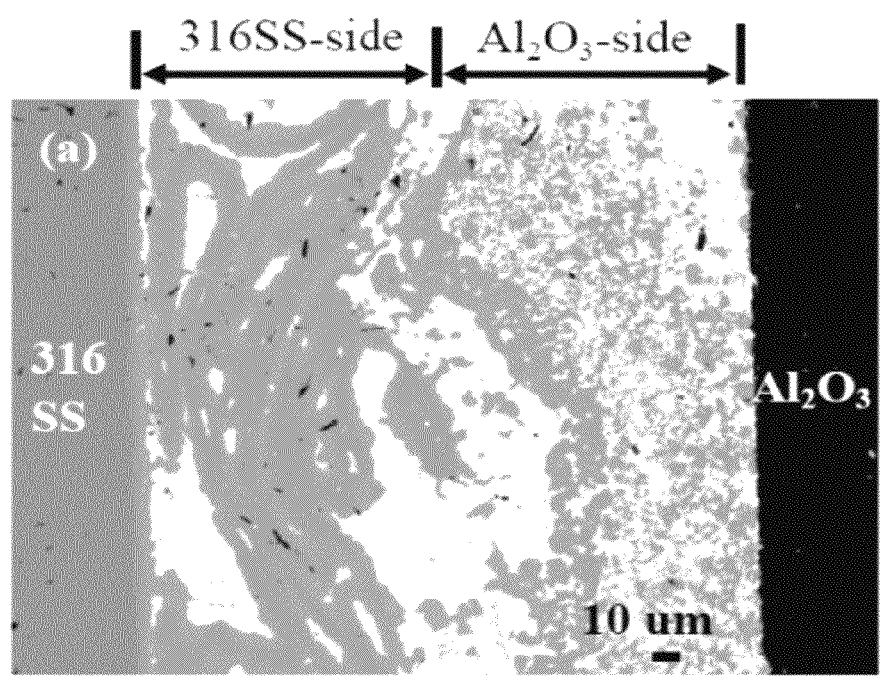
FIG. 3 is a microscopic photograph of the bonding shown in FIG. 1.

Referring to FIG. 3, the AISI 316 SS/Ag—Cu×2/Ni/Ag—Cu-4.5Ti×2/$Al_2O_3$ of FIG. 1 is shown in a microscopic scale. The width of the solder seam is about 210 μm. The thickness of the pressed nickel net is about 200 μm. Hence, it is found that almost all of the Ag—Cu—Ti alloy and the Ag—Cu alloy is filled in the nickel net. It is also found that a wide solder seam is achieved.

On the contrary, a narrow solder seam would jeopardize the deformability of soft metal brazing solder because mixed dislocation is limited. Thus, ability to cope with thermal stress would be compromised, and the solder seam would cause high thermal stress because of high rigidity. It is not easy to obtain a wide solder seam in brazing for difficulty in controlling the width of the brazing solder in the form of fluid. Finally, in boding together elements of large-scale construction, in view of quality control and yield, wide solder seams are preferred.

Referring to FIG. 3, there are tiny grains in the vicinity of the aluminum oxide and there are layers in the vicinity of the AISI 316 stainless steel. Obviously, different reactions occur on two sides of the nickel net.

Figure 4:
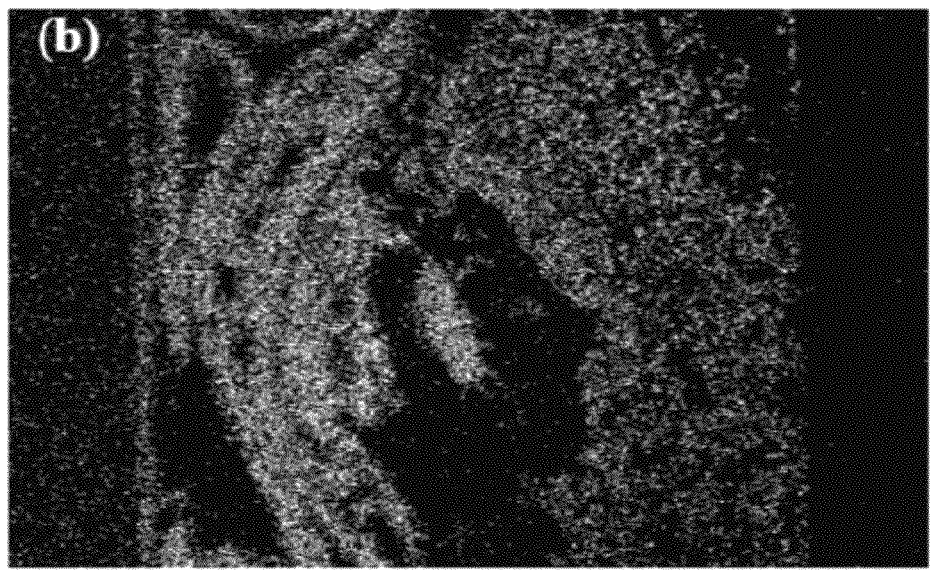
FIG. 4 is a microscopic photograph of nickel included in the bonding shown in FIG. 1.

Referring to FIG. 4, the nickel is evenly distributed in the solder seam between the aluminum oxide and the AISI 316 stainless steel. On the side of the AISI 316 stainless steel, the nickel exists in the form of a net. On the side of the ceramics, the nickel net is shattered by the Ag—Cu—Ti alloy and nickel element is distributed in the silver-based brazing solder.

Figure 5:
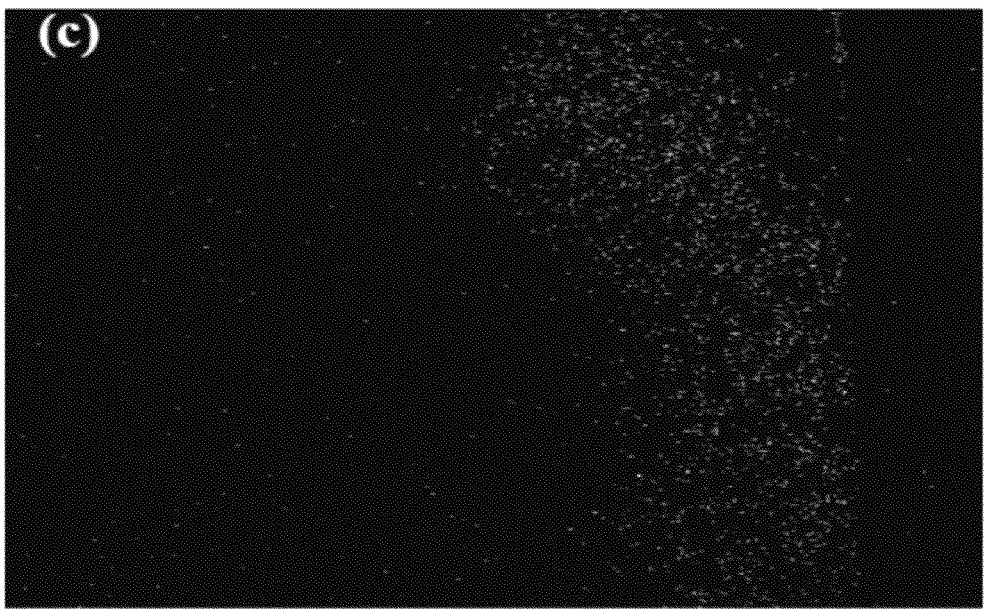
FIG. 5 is a microscopic photograph of titanium included in the bonding shown in FIG. 1.
Figure 6:
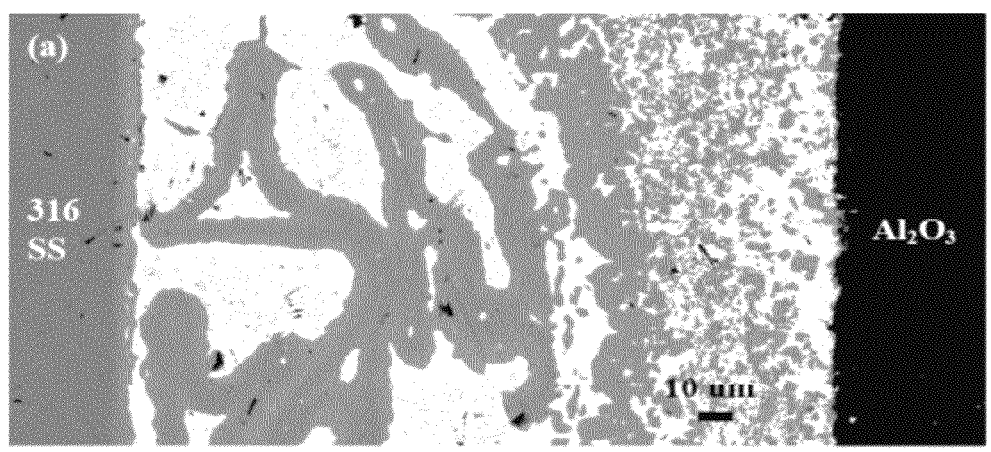
FIGS. 6 to 8 are microscopic photographs of the bonding shown in FIG. 1 to show six points.
Figure 7:
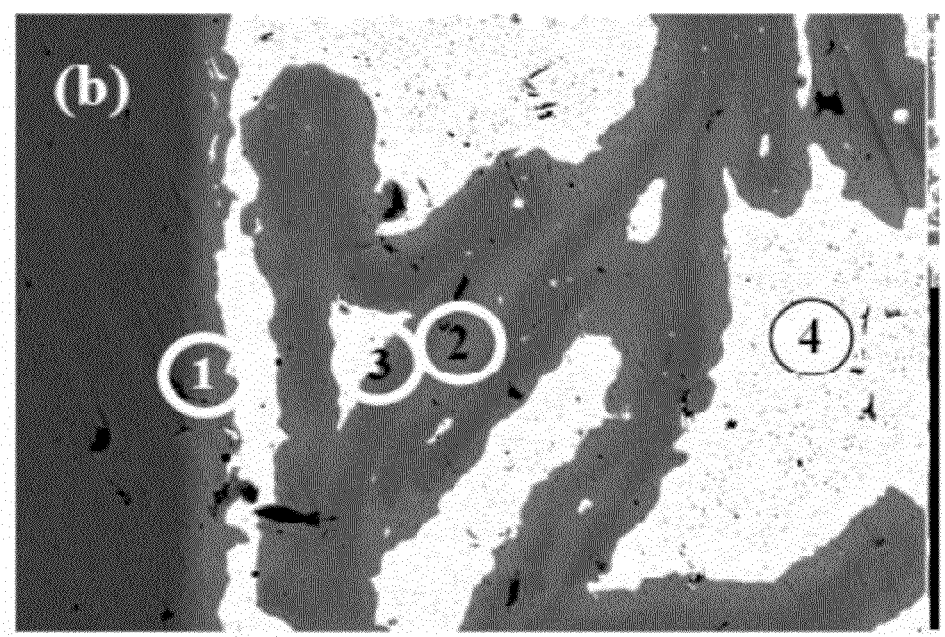
Figure 8:
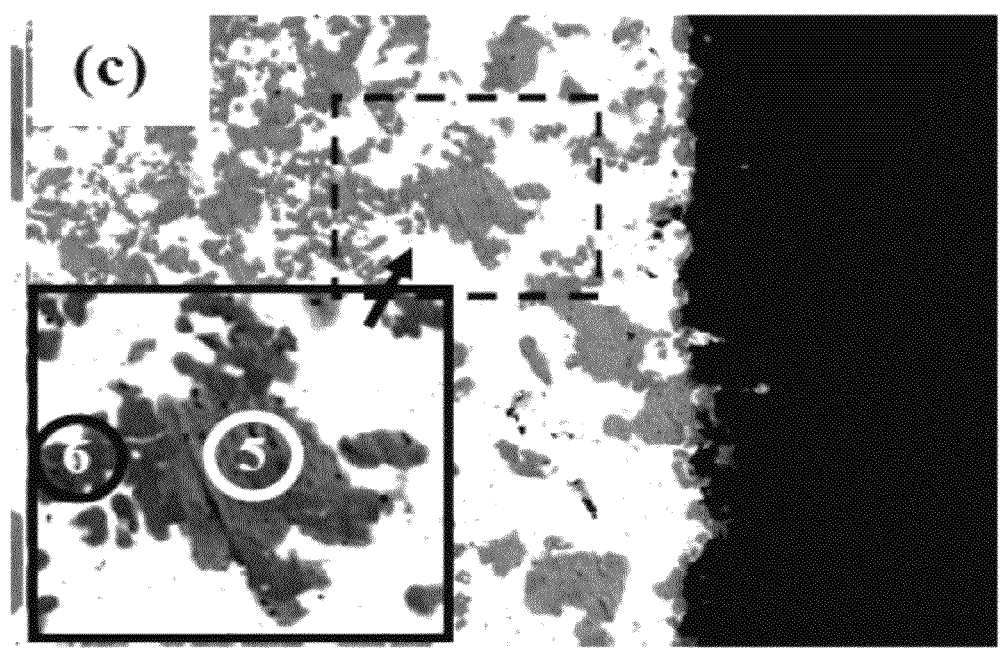
Figure 10:
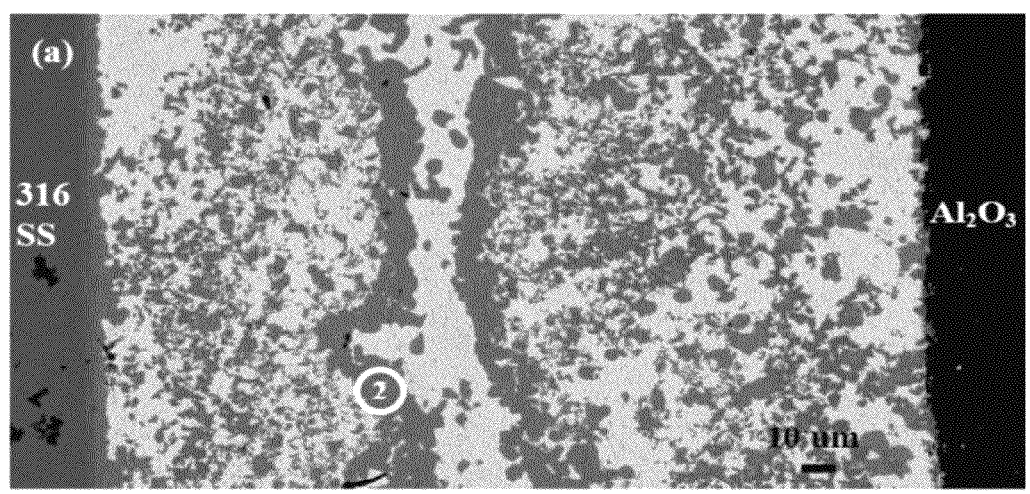
FIGS. 10 through 12 are microscopic photographs of the bonding shown in FIG. 2 to show eight points.
Figure 11:
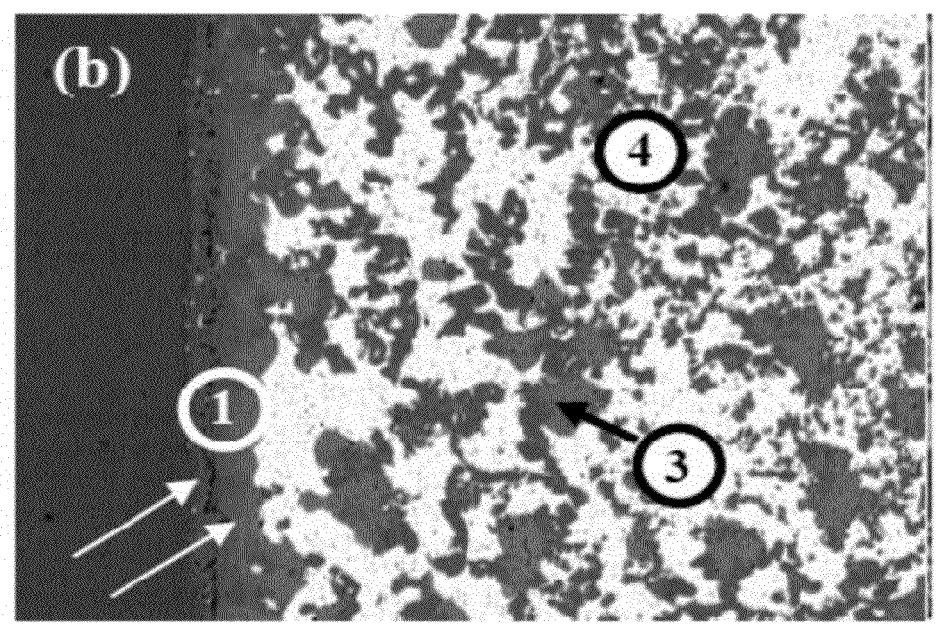
Figure 12:
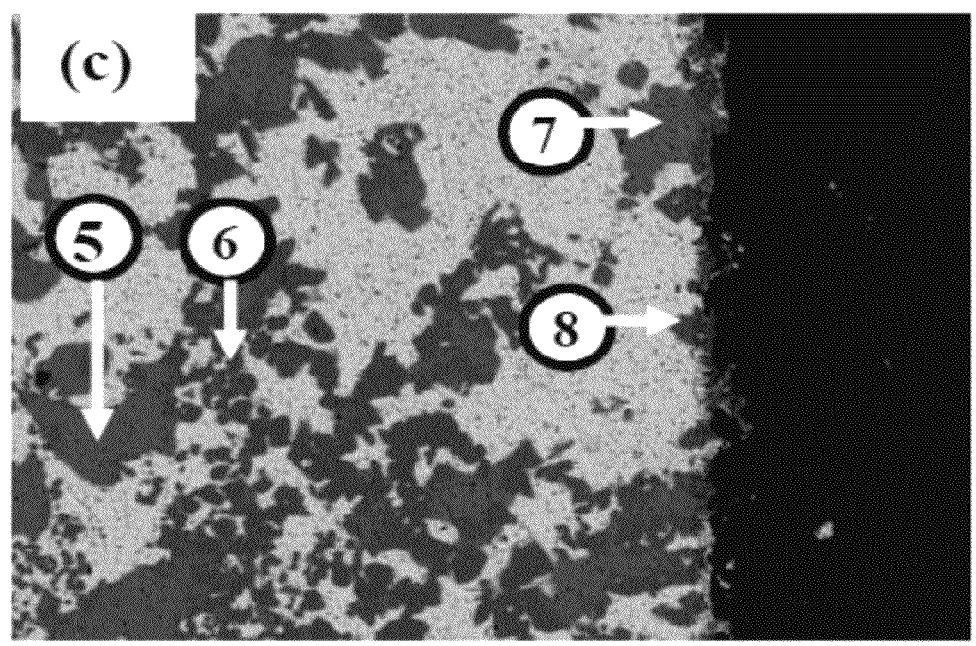

Referring to FIG. 5, most of the titanium exists on the side of the aluminum oxide. It is therefore thought that the nickel net prevents the Ti from spreading into the metal. Points in the solder seam are analyzed.

Referring to FIGS. 6 to 9, there are shown 6 points. Point Nos. 1 and 3 of include mainly copper-nickel solid solution. Point No. 2 includes mainly the nickel net. Point No. 4 includes mainly silver. It is assumed that the nickel net contacts the nickel of the AISI 316 stainless steel and the Ag—Cu, the copper of the Ag—Cu is turned into copper-rich Cu—Ni solid solution on the AISI 316 stainless steel. Point No. 5 includes mainly copper-rich Cu—Ni. Point No. 6 includes mainly $TiNi_3$. Obviously, the nickel net is dissolved by the titanium of the Ag—Cu—Ti alloy and reacts with the copper of the Ag—Cu—Ti alloy to produce larger and lighter-shaded grains of Ni—Cu and smaller and darker grains of $TiNi_3$, an intermetallic compound.

Point 4 is in a silver-rich phase. The silver-rich phase is a continuous phase that exhibits the possibility of plastic deformation to release thermal stress from the bonding. On the side of the ceramics, the silver-rich phase includes the larger grains of Ni—Cu and the smaller grains of $TiNi_3$, the intermetallic compound. The silver-rich phase uses the $TiNi_3$ for precipitation hardening and uses the Ni—Cu for solution hardening. On the side of the AISI 316 stainless steel, there is not titanium. Why? The analysis of point No. 3 provides some clues. Obviously, if a layer of Cu—Ni forms on the nickel net, it will stop the Ti from diffusing to the AISI 316 stainless steel. In the process, Ag—Cu alloy of a melting point lower than that of Ag—Cu—Ti alloy is filled in the nickel net to form the Cu—Ni on a side of the nickel net so that the side of the nickel net is already protected when the Ag—Cu—Ti alloy finally melts and flows into the nickel net from the side of the ceramics. The structure of the bonding on the side of the AISI 316 stainless steel is in a continuous phase rich of silver. Ni nets with a solution-hardening surface, behaved as fiber reinforcements, exist on the side of the AISI 316 stainless steel. Advantageously, many hardening mechanisms are provided in the silver-rich phase to increase the mechanical strength of the silver-rich matrix. These mechanisms include precipitation hardening, solid-solution hardening and fiber-reinforced strengthening.

There is Cu—Ni at the interface between the AISI 316 stainless steel and the solder seam. There are not continuous reaction layers at the $Al_2O_3$/solder seam interface. Reaction products exist at this interface discontinuously. The larger grains are Ni—Cu while the smaller grains are $TiNi_3$, the intermetallic compound. Traditionally, when Ag—Cu—Ti alloy is used in brazing for bonding stainless steel to $Al_2O_3$, there is a continuous thick layer of reactant, mainly $Ti_3Cu_3O$ and $Ti_xO$. A continuous reaction layer of any fragile material is bad for the mechanical strength at the interface. If a crack appears, it will soon cause fissures at the bonding. The nickel net seems to attract the titanium of the Ag—Cu—Ti alloy to stop the titanium from diffusing to the $Al_2O_3$ to prevent overreaction from forming a continuous reaction layer. Advantageously, the nickel net suppresses the diffusion of the active element of the active brazing solder to control the reaction layer on the side of the $Al_2O_3$ without comprising the wetting, reaction and bonding.

Referring to FIGS. 10 to 13, there is shown the AISI 316 SS/Ag—Cu-4.5Ti×2/Ni/Ag—Cu-4.5Ti×2/$Al_2O_3$ of FIG. 2. The nickel net contacts the Ag—Cu—Ti brazing solder on both sides. The microstructure on the side of the AISI 316 stainless steel is similar to the microstructure on the side of the aluminum oxide. Separated by the nickel net, on the side of AISI 316 stainless steel and on the side of the aluminum oxide, there are many discontinuous tiny grains. Analyses are conducted at eight points. Point No. 2 includes copper-rich Cu—Ni solid solution. Point Nos. 3, 5 and 7 includes copper-rich Cu—Ni alloy. Point No. 6 includes $TiNi_3$, educt. Point No. 1 between the AISI 316 stainless steel and the brazing solder includes nickel, titanium and copper. Titanium spreads to the side of the stainless steel and reacts to form a continuous internal-metal reaction layer. Because of the fragility of the intermetallic reaction layer, there are cracks at the interface as indicated by arrow heads shown in FIG. 12. Point No. 8 between the $Al_2O_3$ and the brazing solder includes copper-rich Cu—Ni alloy and nanometer analyzed Ni—Cu—Ti—O compound. The Ni—Cu—Ti—O compound is similar to $Ti_3Cu_3O$ that occurs in the transitional brazing.

Regarding the mechanical strength, the AISI 316 SS/Ag—Cu×2/Ni/Ag—Cu-4.5Ti×2/$Al_2O_3$ stops the titanium of the Ag—Cu—Ti alloy from diffusing to the side of the AISI 316 stainless steel from the side of the aluminum oxide with the help from the nickel net. Therefore, titanium only exists in the nickel net and on the side of the aluminum oxide. On this side, the Ti spreads to and reacts with the aluminum oxide to provide bonds. The Ag—Cu alloy fills the nickel net so that the nickel net not only stops the Ti from spreading to the side of the metal but also strengthen the Ag—Cu alloy. In shear tests, fractures are found to exist in the aluminum oxide, and this means that the mechanical strength of the solder seam is higher than that of the aluminum oxide. The cracks advance to flaws in the aluminum oxide. In one of the shear tests, the bonding survives with a shear strength of 384 MPa and performs better than aluminum oxide. In the other shear tests, the bonding breaks at 180 MPa and 199 MPa, respectively. In specific, the bonding breaks from the aluminum oxide because the mechanical strength of the solder seam is higher than that of the aluminum oxide. Hence, it is found that the nickel net works like an structure of a building, and the Ni net was inserted to control the Ti diffusion toward alumina and the Ti reaction on alumina surface was controlled in order to prevent the formation of continuous brittle reaction layers at alumina side. Moreover, the nickel net suppresses the diffusion of the titanium. Therefore, excellent mechanical strength against shear is achieved.

Regarding the AISI 316 SS/Ag—Cu-4.5Ti×2/Ni/Ag—Cu-4.5Ti×2/$Al_2O_3$ shown in FIG. 2, the Ag—Cu—Ti alloy is provided on both sides of the nickel net. In double shear mechanical tests, the bonding breaks at 128 MPa, 137 MPa and 185 MPa, respectively. The average mechanical strength against shear is 150±31 MPa. As there are tiny cracks at the brazing solder/stainless steel interface, the mechanical strength of this bonding is lower than that of the bonding shown in FIG. 1.

Figure 14:
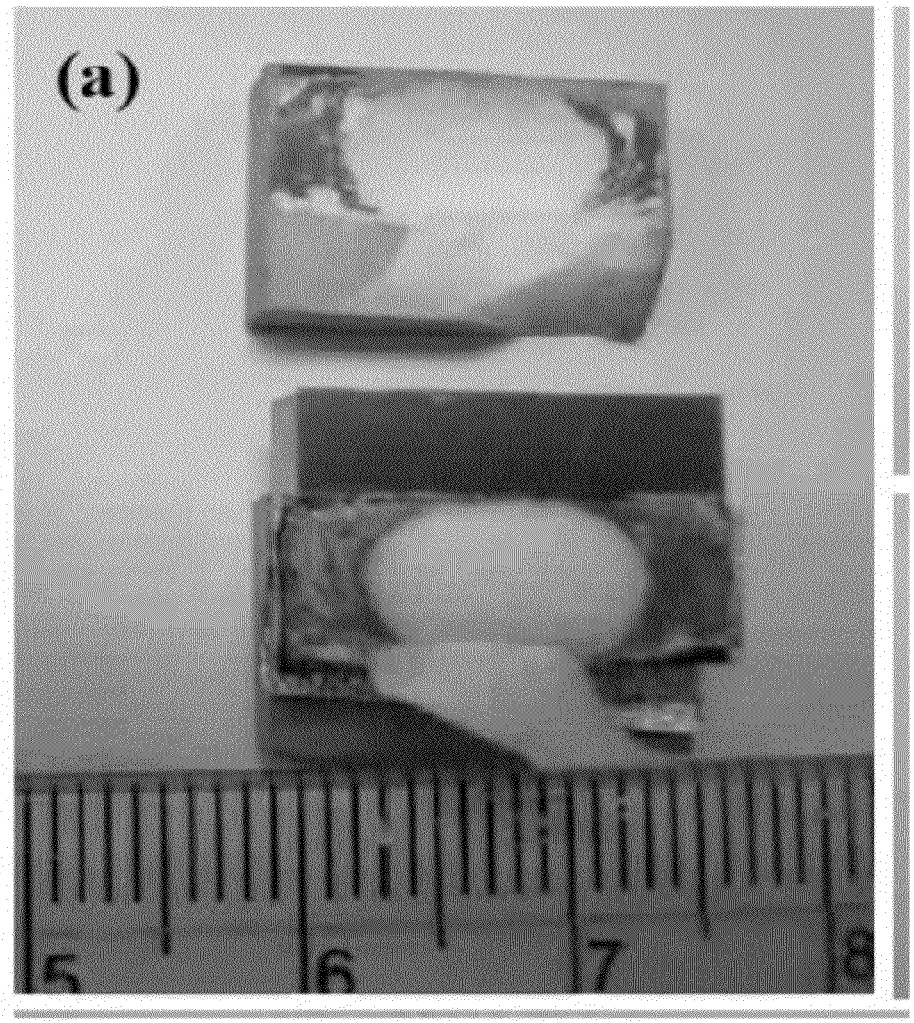
FIGS. 14 to 16 are photographs of three specimens in shear tests.
Figure 15:
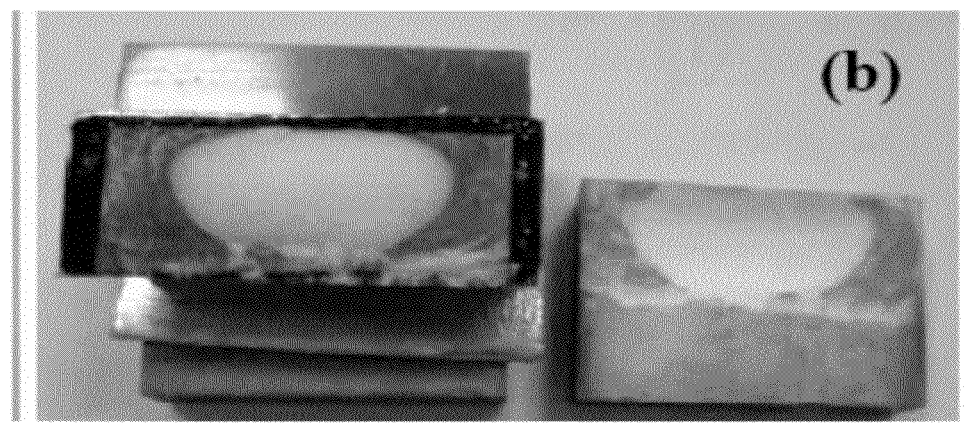
Figure 16:
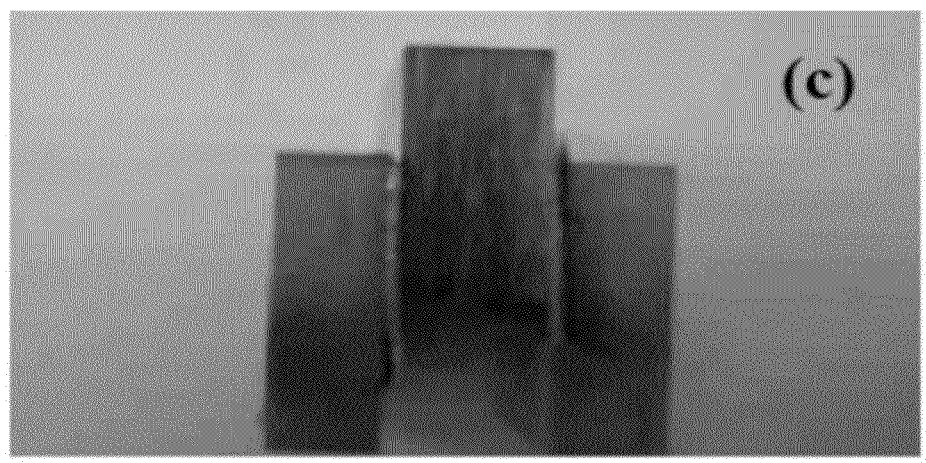
Figure 17:
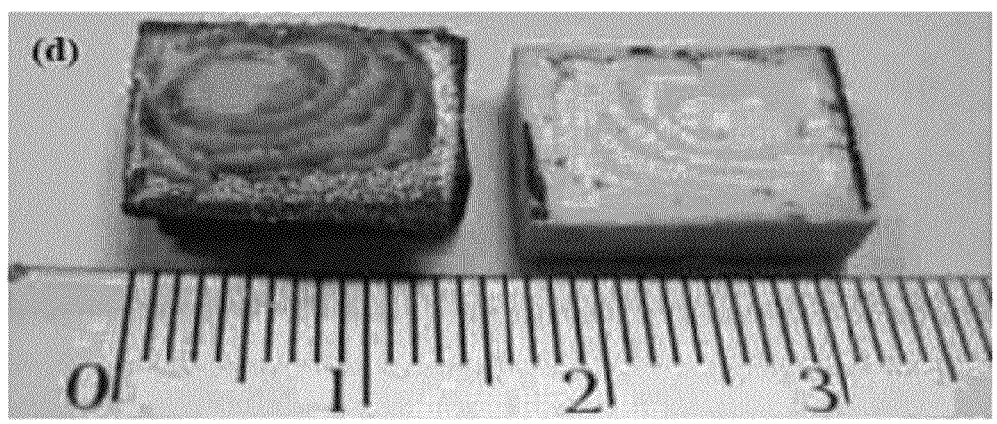
FIG. 17 is a photograph of a specimen subjected to thermal shocks.

In the double-shear mechanical tests on the bonding shown in FIG. 1, fractures occur in the aluminum oxide of the first and second specimens because the mechanical strength of the bonding is higher than the aluminum oxide. $Al_2O_3$ can be left on the other fractured section, indicating the true interfacial shear strength is higher than that of $Al_2O_3$ bulks. The first specimen broken from the aluminum oxide at 180 MPa is shown in FIG. 14, and the second specimen breaks from the aluminum oxide at 199 MPa as shown in FIG. 15. As shown in FIG. 16, the third specimen survives shear stress of 384 MPa, better than aluminum oxide. Referring to FIG. 17, the bonding fails after nine thermal shocks.

As described above, the bonding of the present invention exhibits higher mechanical strength than the prior arts discussed in the Related Prior Art.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A method for effectively bonding stainless steel to aluminum oxide including the steps of:
   providing a first substrate of the stainless steel;
   filling solder in the first substrate;
   providing a second substrate of the aluminum oxide;
   filling solder in the second substrate;
   providing a net;
   pressing the net;
   locating the net between the first and second substrates to form a laminate and clamping the laminate;
   locating the laminate in a vacuum oven;
   increasing the temperature in the vacuum oven;

retaining the temperature in the vacuum oven; and decreasing the temperature in the vacuum oven, wherein the net is made of nickel.

2. The method according to claim 1, wherein the solder filled in the first substrate is silver-copper brazing solder.

3. The method according to claim 1, wherein the solder filled in the second substrate is silver-copper-titanium brazing solder.

4. The method according to claim 1, wherein the pressing of the net is done by a hydraulic device operated at 300 to 500 psi for 5 to 15 minutes.

5. The method according to claim 1, wherein the vacuum oven is operated at 10-4 to 10-6 Torr.

6. The method according to claim 1, wherein the step of retaining the temperature in the vacuum oven includes the step of retaining the temperature in the vacuum oven at 800° C. to 1000° C.

7. The method according to claim 1, wherein the step of decreasing the temperature in the vacuum oven includes the step of decreasing the temperature in the vacuum oven at a rate of 5 to 15° C./min.

8. The method according to claim 3, wherein the silver-copper-titanium brazing solder includes 68.8 wt % of silver, 26.7 wt % of copper and 4.5 wt % of titanium, wherein the titanium is used for reacting with oxide to improve the wetability between the ceramics and the metal.

* * * * *